US012614864B2

(12) United States Patent
Sazegar et al.

(10) Patent No.: US 12,614,864 B2
(45) Date of Patent: Apr. 28, 2026

(54) ACTIVE METASURFACE ARCHITECTURES

(71) Applicant: Kymeta Corporation, Redmond, WA (US)

(72) Inventors: Mohsen Sazegar, Woodinville, WA (US); Mohammad Ranjbarnikkhah, Lynnwood, WA (US); Ryan Stevenson, Woodinville, WA (US)

(73) Assignee: Kymeta Corporation, Redmond, WA (US)

( * ) Notice: Subject to any disclaimer, the term of this patent is extended or adjusted under 35 U.S.C. 154(b) by 84 days.

(21) Appl. No.: 18/532,905

(22) Filed: Dec. 7, 2023

(65) Prior Publication Data

US 2024/0195084 A1 Jun. 13, 2024

Related U.S. Application Data

(60) Provisional application No. 63/432,005, filed on Dec. 12, 2022.

(51) Int. Cl.

| | |
|---|---|
| ***H01Q 21/06*** | (2006.01) |
| ***H01Q 3/28*** | (2006.01) |
| ***H01Q 3/36*** | (2006.01) |
| ***H01Q 9/04*** | (2006.01) |
| ***H01Q 23/00*** | (2006.01) |

(52) U.S. Cl.

CPC ............... *H01Q 23/00* (2013.01); *H01Q 3/28* (2013.01); *H01Q 3/36* (2013.01); *H01Q 9/0442* (2013.01)

(58) Field of Classification Search

CPC ......................... H01Q 15/0086; H01Q 21/065

See application file for complete search history.

(56) References Cited

U.S. PATENT DOCUMENTS

2012/0306698 A1* 12/2012 Warnick .................. H01Q 5/35 343/893
2013/0114470 A1 5/2013 Lee et al.
(Continued)

FOREIGN PATENT DOCUMENTS

TW 201921797 A 6/2019
WO 2022/150916 A1 7/2022

OTHER PUBLICATIONS

International Preliminary Report on Patentability received for PCT application No. PCT/IB2023/062411, mailed on Jun. 26, 2025, 7 pages.

(Continued)

*Primary Examiner* — Awat M Salih
(74) *Attorney, Agent, or Firm* — Womble Bond Dickinson (US) LLP

(57) ABSTRACT

Antennas and methods for using the same are disclosed. In some embodiments, an antenna includes a metasurface having radiating antenna elements and amplifiers configured to amplify signals for the radiating antenna elements, wherein, for each of the radiating antenna elements, the metasurface includes one or both of: a receive path having a low noise amplifier (LNA) configured to amplify a first set of received signals, at least one radiating antenna element configured to receive the first set of received signals, and a transmit path having a power amplifier (PA) configured to amplify a second set of transmit signals, the second set of transmit signals to be transmitted from the one radiating antenna element.

22 Claims, 7 Drawing Sheets

(56) References Cited

U.S. PATENT DOCUMENTS

| | | | | |
|---|---|---|---|---|
| 2021/0258069 A1* | 8/2021 | Sazegar | ............... | H04B 7/0874 |
| 2022/0115780 A1* | 4/2022 | Wang | ................... | H01Q 9/0414 |
| 2024/0072452 A1* | 2/2024 | Taravati | ................... | H01Q 3/44 |

OTHER PUBLICATIONS

International search Report and written opinion received for PCT application No. PCT/IB2023/062411, mailed on Mar. 20, 2024, 8 pages.

Office Action received in related Taiwanese application No. 112148311, mailed Mar. 10, 2026, 24 pages.

* cited by examiner

ACTIVE METASURFACE ARCHITECTURES

RELATED APPLICATION

The present application is a non-provisional application of and claims the benefit of U.S. Provisional Patent Application No. 63/432,005, filed Dec. 12, 2022, and entitled "Active Metasurface Architectures", which is incorporated by reference in its entirety.

FIELD OF THE DISCLOSURE

Embodiments of the present disclosure are related to wireless communication; more particularly, embodiments disclosed herein related to metasurface antennas that include integrated amplifiers for amplifying received signals and signals to be transmitted.

BACKGROUND

Metasurface antennas have recently emerged as a new flat-panel antenna technology for generating steered, directive beams from a lightweight, low-cost, and planar physical platform. Such metasurface antennas have been recently used in a number of applications, such as, for example, satellite communication.

Metasurface antennas may comprise metamaterial antenna elements that can selectively couple energy from a feed wave to produce beams that may be controlled for use in communication. These antennas are capable of achieving comparable performance to phased array antennas from an inexpensive and easy-to-manufacture hardware platform.

Some metasurface implementations are either reflective or transmissive metasurfaces, some embodiments of which incorporate gain elements. Some metasurface embodiments comprise metamaterial absorbers. However, some reflective or transmissive metasurfaces only receive a field from free space and then are able to reflect or reradiate a signal into free space after the signal is amplified.

Existing diffractive metasurface antenna solutions are passive and do not incorporate gain into the metasurface. This causes a few different disadvantages for passive antennas. Passive antennas require a central low noise amplifier (LNA) and transmit amplifier at the feed point to the antenna (referred to as central radio-frequency (RF) chain). Classic central RF chains are bulky components and increase the height profile of the antenna. Furthermore, the central power amplifier (PA) generates a significant amount of heat locally at the PA. The local heating causes an uneven temperature profile across the antenna. In addition, central PAs and block-up-converters (BUCs) are relatively expensive and are a cost driver of the entire system. Another problem that exists on the receive path is that the received signal must go through the passive antenna and feeding network before it arrives at the LNA. This signal path is lossy and the experienced loss increases the antenna noise temperature, which reduces the Gain-to-Noise Temperature ratio (G/T) of the received signal.

SUMMARY

Antennas and methods for using the same are disclosed. In some embodiments, an antenna includes a metasurface having radiating antenna elements and amplifiers configured to amplify signals for the radiating antenna elements, wherein, for each of the radiating antenna elements, the metasurface includes one or both of: a receive path having a low noise amplifier (LNA) configured to amplify a first set of received signals, at least one radiating antenna element configured to receive the first set of received signals, and a transmit path having a power amplifier (PA) configured to amplify a second set of transmit signals, the second set of transmit signals to be transmitted from the one radiating antenna element.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
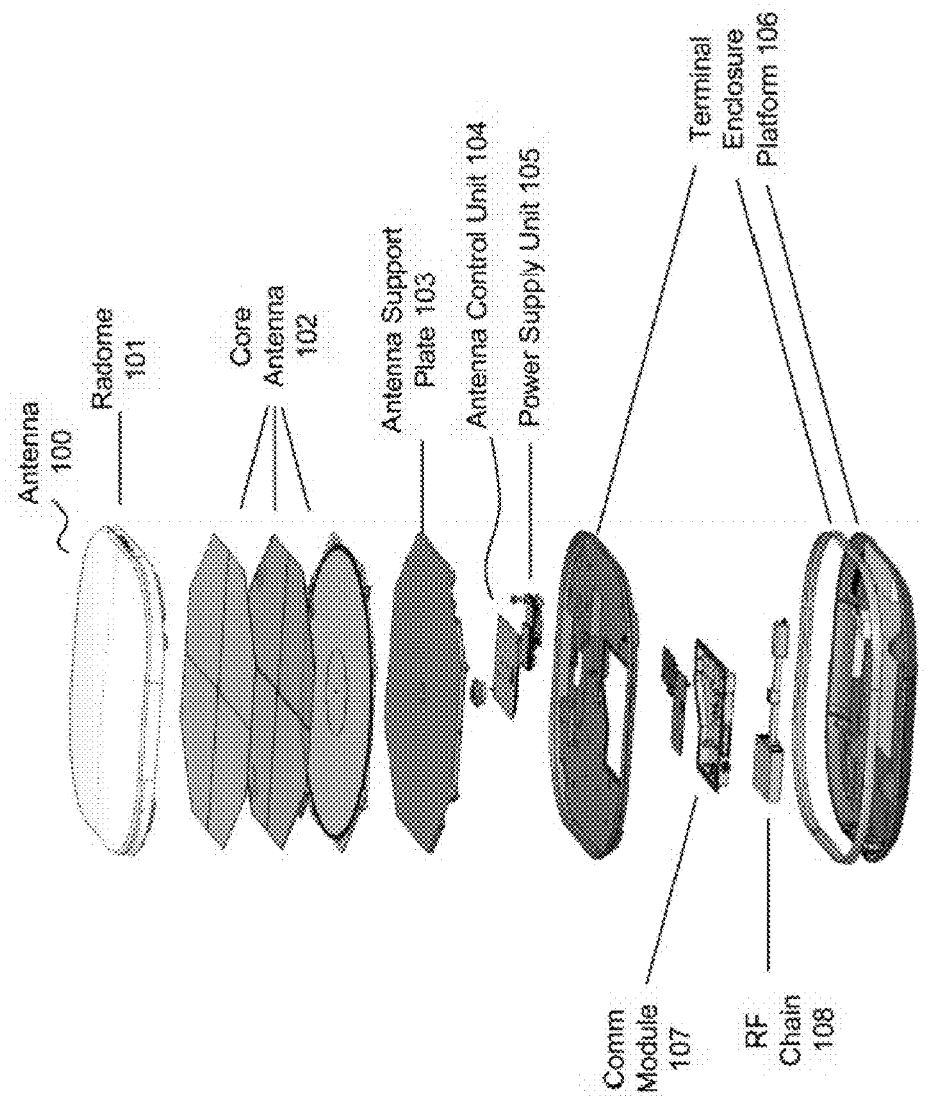
FIG. 1 illustrates an exploded view of some embodiments of a flat-panel antenna.

In the following description, numerous details are set forth to provide a more thorough explanation of embodiments of the present disclosure. It will be apparent, however, to one skilled in the art, that the teachings disclosed herein may be practiced without these specific details. In other instances, well-known structures and devices are shown in block diagram form, rather than in detail, in order to avoid obscuring the present disclosure.

Embodiments disclosed herein include antenna apparatuses and method for antennas with active metasurfaces. In some embodiments, configurations for the active metasurface include amplifiers that are incorporated into a metasurface to amplify a signal that has been received or a signal that is to be transmitted. The techniques disclosed herein can be used to receive a signal with a radiating antenna element, amplify it, and then pass it on to a waveguide (e.g., a parallel plate waveguide). Furthermore, in some embodiments, while the signal is passing through the metasurface, its amplitude and phase can be adjusted to create a hologram for beam forming.

Moreover, using the techniques disclosed according to at least some embodiments can provide further advantages, for example, the central power amplifier (PA) at the back end of the antenna can be replaced by a distributed PA array at the frontend and a much smaller PA on the back of the antenna. This is advantageous in that the total power can be distributed, leading to a lower height profile, uniform distribution of the generated heat and potentially a lower cost. Furthermore, replacing the central PA at the back end of the antenna by a distributed low noise amplifier (LNA) array at the frontend of the antenna (accompanied by a second LNA on the back) has the advantage that the received signal arrives at the LNA before it goes through the entire lossy path on the antenna. Thus, the signal can be amplified at the LNA before it's passed on through the metasurface, the waveguide and any diplexer in the antenna.

The following disclosure discusses examples of antenna apparatus embodiments that can be part of terminals such as those described herein, followed by details of active metasurfaces with amplifiers incorporated in the metasurface.

Examples of Antenna Embodiments

The techniques described herein may be used with a variety of flat panel satellite antennas. Some embodiments of such flat panel antennas are disclosed herein. In some embodiments, the flat panel satellite antennas are part of a satellite terminal. The flat panel antennas include one or more arrays of antenna elements on an antenna aperture.

In some embodiments, the antenna aperture is a metasurface antenna aperture, such as, for example, the antenna apertures described below. In some embodiments, the antenna elements comprise radio-frequency (RF) radiating antenna elements. In some embodiments, the antenna elements include tunable devices to tune the antenna elements. Examples of such tunable devices include diodes and varactors such as, for example, described in U.S. Pat. No. 11,489,266, entitled "Metasurface Antennas Manufactured with Mass Transfer Technologies," issued Nov. 1, 2022. In some other embodiments, the antenna elements comprise liquid crystal (LC)-based antenna elements, such as, for example, those disclosed in U.S. Pat. No. 9,887,456, entitled "Dynamic Polarization and Coupling Control from a Steerable Cylindrically Fed Holographic Antenna", issued Feb. 6, 2018, or other RF radiating antenna elements. It should be appreciated that other tunable devices such as, for example, but not limited to, tunable capacitors, tunable capacitance dies, packaged dies, micro-electromechanical systems (MEMS) devices, or other tunable capacitance devices, could be placed into an antenna aperture or elsewhere in variations on the embodiments described herein.

Although embodiments in this disclosure may draw on some examples in communications, some embodiments could be implemented in various receiving, transmitting, and/or sensing or other similar applications. Some examples could include devices for radar, lidar, sensors and sensing device such as, but not limited to, those in autonomous vehicles applications, and any other applications that can take advantage of attributes of an active metasurface according to various disclosed and undisclosed embodiments of the present disclosure.

In some embodiments, the antenna aperture having the one or more arrays of antenna elements is comprised of multiple segments that are coupled together. In some embodiments, when coupled together, the combination of the segments form groups of antenna elements (e.g., closed rings of antenna elements concentric with respect to the antenna feed, etc.). For more information on antenna segments, see U.S. Pat. No. 9,887,455, entitled "Aperture Segmentation of a Cylindrical Feed Antenna", issued Feb. 6, 2018.

FIG. 1 illustrates an exploded view of some embodiments of a flat-panel antenna. Referring to FIG. 1, antenna 100 comprises a radome 101, a core antenna 102, antenna support plate 103, antenna control unit (ACU) 104, a power supply unit 105, terminal enclosure platform 106, comm (communication) module 107, and RF chain 108.

Radome 101 is the top portion of an enclosure that encloses core antenna 102. In some embodiments, radome 101 is weatherproof and is constructed of material transparent to radio waves to enable beams generated by core antenna 102 to extend to the exterior of radome 101.

In some embodiments, core antenna 102 comprises an aperture having RF radiating antenna elements. These antenna elements act as radiators (or slot radiators). In some embodiments, the antenna elements comprise scattering metamaterial antenna elements. In some embodiments, the antenna elements comprise both Receive (Rx) and Transmit (Tx) irises, or slots, that are interleaved and distributed on the whole surface of the antenna aperture of core antenna 102. Such Rx and Tx irises may be in groups of two or more sets where each set is for a separately and simultaneously controlled band. Examples of such antenna elements with irises are described in U.S. Pat. No. 10,892,553, entitled "Broad Tunable Bandwidth Radial Line Slot Antenna", issued Jan. 12, 2021.

In some embodiments, the antenna elements comprise irises (iris openings) and the aperture antenna is used to generate a main beam shaped by using excitation from a cylindrical feed wave for radiating the iris openings through tunable elements (e.g., diodes, varactors, patch, etc.). In some embodiments, the antenna elements can be excited to radiate a horizontally or vertically polarized electric field at desired scan angles.

In some embodiments, a tunable element (e.g., diode, varactor, patch etc.) is located over each iris slot. The amount of radiated power from each antenna element is controlled by applying a voltage to the tunable element using a controller in ACU 104. Traces in core antenna 102 to each tunable element are used to provide the voltage to the tunable element. The voltage tunes or detunes the capacitance and thus the resonance frequency of individual elements to effectuate beam forming. The voltage required is dependent on the tunable element in use. Using this property, in some embodiments, the tunable element (e.g., diode, varactor, LC, etc.) integrates an on/off switch for the transmission of energy from a feed wave to the antenna element. When switched on, an antenna element emits an electromagnetic wave like an electrically small dipole antenna. Note that the teachings herein are not limited to having unit cell that operates in a binary fashion with respect to energy transmission. For example, in some embodiments in which varactors are the tunable element, there are 32 tuning levels. As another example, in some embodiments in which LC is the tunable element, there are 16 tuning levels.

A voltage between the tunable element and the slot can be modulated to tune the antenna element (e.g., the tunable resonator/slot). Adjusting the voltage varies the capacitance of a slot (e.g., the tunable resonator/slot). Accordingly, the reactance of a slot (e.g., the tunable resonator/slot) can be varied by changing the capacitance. Resonant frequency of the slot also changes according to the equation $$f = \frac{1}{2\pi\sqrt{LC}}$$

where f is the resonant frequency of the slot and L and C are the inductance and capacitance of the slot, respectively. The resonant frequency of the slot affects the energy coupled from a feed wave propagating through the waveguide to the antenna elements.

In particular, the generation of a focused beam by the metamaterial array of antenna elements can be explained by the phenomenon of constructive and destructive interference, which is well known in the art. Individual electromagnetic waves sum up (constructive interference) if they have the same phase when they meet in free space to create a beam, and waves cancel each other (destructive interference) if they are in opposite phase when they meet in free space. If the slots in core antenna 102 are positioned so that each successive slot is positioned at a different distance from the excitation point of the feed wave, the scattered wave from that antenna element will have a different phase than the scattered wave of the previous slot. In some embodiments, if the slots are spaced one quarter of a wavelength apart, each slot will scatter a wave with a one fourth phase delay from the previous slot. In some embodiments, by controlling which antenna elements are turned on or off (i.e., by changing the pattern of which antenna elements are turned on and which antenna elements are turned off) or which of the multiple tuning levels is used, a different pattern of constructive and destructive interference can be produced, and the antenna can change the direction of its beam(s).

In some embodiments, core antenna 102 includes a coaxial feed that is used to provide a cylindrical wave feed via an input feed, such as, for example, described in U.S. Pat. No. 9,887,456, entitled "Dynamic Polarization and Coupling Control from a Steerable Cylindrically Fed Holographic Antenna", issued Feb. 6, 2018 or in U.S. Pat. No. 11,489,266, entitled "Metasurface Antennas Manufactured with Mass Transfer Technologies," issued Nov. 1, 2022. In some embodiments, the cylindrical wave feed feeds core antenna 102 from a central point with an excitation that spreads outward in a cylindrical manner from the feed point. In other words, the cylindrically fed wave is an outward travelling concentric feed wave. Even so, the shape of the cylindrical feed antenna around the cylindrical feed can be circular, square or any shape. In some other embodiments, a cylindrically fed antenna aperture creates an inward travelling feed wave. In such a case, the feed wave most naturally comes from a circular structure.

In some embodiments, the core antenna comprises multiple layers. These layers include the one or more substrate layers forming the RF radiating antenna elements. In some embodiments, these layers may also include impedance matching layers (e.g., a wide-angle impedance matching (WAIM) layer, etc.), one or more spacer layers and/or dielectric layers. Such layers are well-known in the art.

Antenna support plate 103 is coupled to core antenna 102 to provide support for core antenna 102. In some embodiments, antenna support plate 103 includes one or more waveguides and one or more antenna feeds to provide one or more feed waves to core antenna 102 for use by antenna elements of core antenna 102 to generate one or more beams.

ACU 104 is coupled to antenna support plate 103 and provides controls for antenna 100. In some embodiments, these controls include controls for drive electronics for antenna 100 and a matrix drive circuitry to control a switching array interspersed throughout the array of RF radiating antenna elements. In some embodiments, the matrix drive circuitry uses unique addresses to apply voltages onto the tunable elements of the antenna elements to drive each antenna element separately from the other antenna elements.

In some embodiments, the drive electronics for ACU 104 comprise commercial off-the shelf LCD controls used in commercial television appliances that adjust the voltage for each antenna element.

More specifically, in some embodiments, ACU 104 supplies an array of voltage signals to the tunable devices of the antenna elements to create a modulation, or control, pattern. The control pattern causes the elements to be tuned to different states. In some embodiments, ACU 104 uses the control pattern to control which antenna elements are turned on or off (or which of the tuning levels is used) and at which phase and amplitude level at the frequency of operation. The elements are selectively detuned for frequency operation by voltage application. In some embodiments, multistate control is used in which various elements are turned on and off to varying levels, further approximating a sinusoidal control pattern, as opposed to a square wave (i.e., a sinusoid gray shade modulation pattern).

In some embodiments, ACU 104 also contains one or more processors executing the software to perform some of the control operations. ACU 104 may control one or more sensors (e.g., a GPS receiver, a three-axis compass, a 3-axis accelerometer, 3-axis gyro, 3-axis magnetometer, etc.) to provide location and orientation information to the processor(s). The location and orientation information may be provided to the processor(s) by other systems in the earth station and/or may not be part of the antenna system.

Antenna 100 also includes a comm (communication) module 107 and an RF chain 108. Comm module 107 includes one or more modems enabling antenna 100 to communicate with various satellites and/or cellular systems, in addition to a router that selects the appropriate network route based on metrics (e.g., quality of service (QOS) metrics, e.g., signal strength, latency, etc.). RF chain 108 converts analog RF signals to digital form. In some embodiments, RF chain 108 comprises electronic components that may include amplifiers, filters, mixers, attenuators, and detectors.

Antenna 100 also includes power supply unit 105 to provide power to various subsystems or parts of antenna 100.

Antenna 100 also includes terminal enclosure platform 106 that forms the enclosure for the bottom of antenna 100. In some embodiments, terminal enclosure platform 106 comprises multiple parts that are coupled to other parts of antenna 100, including radome 101, to enclose core antenna 102.

Figure 2:
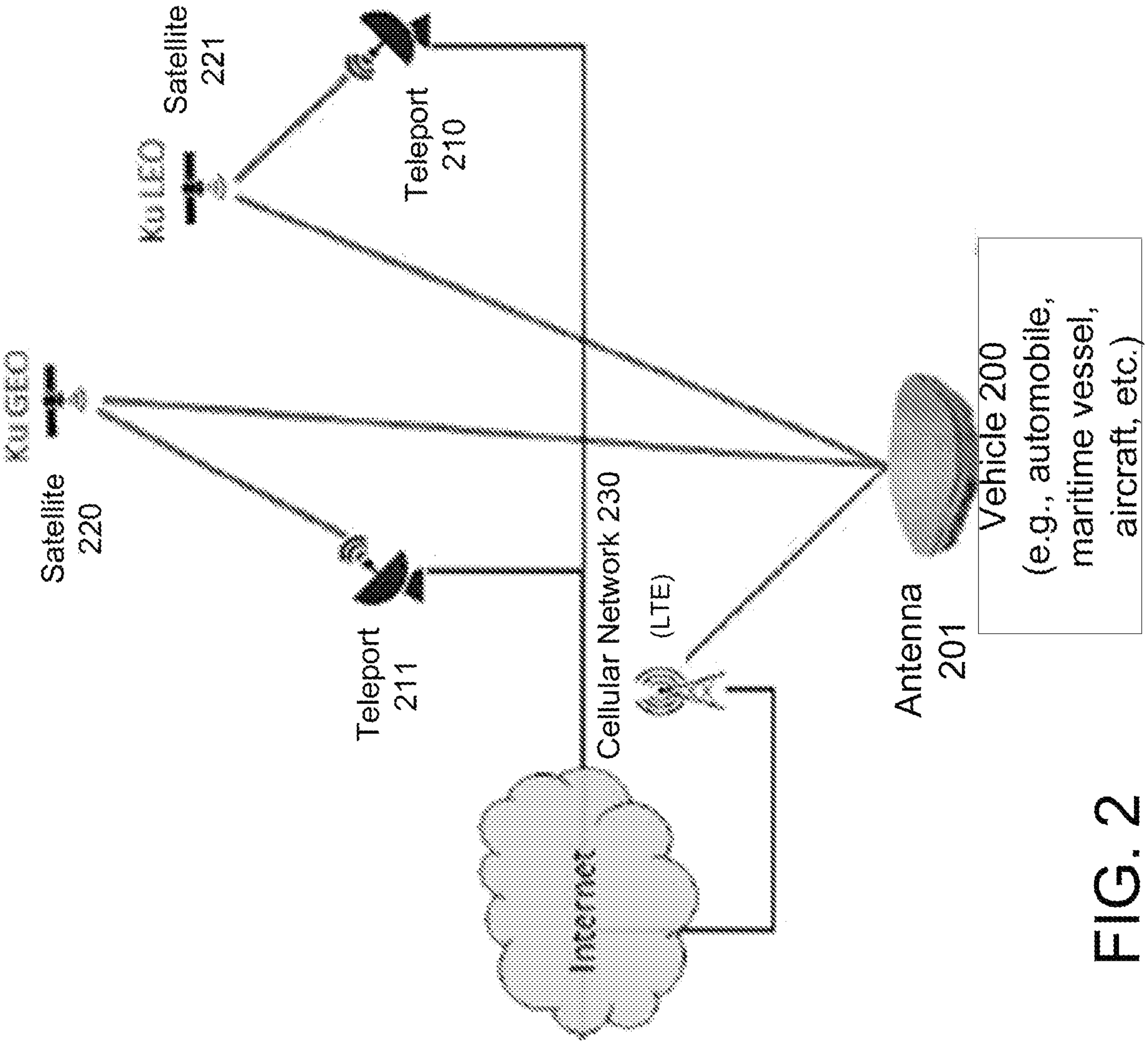
FIG. 2 illustrates an example of a communication system that includes one or more antennas according to some embodiments.

FIG. 2 illustrates an example of a communication system that includes one or more antennas described herein. Referring to FIG. 2, vehicle 200 includes an antenna 201. In some embodiments, antenna 201 comprises antenna 100 of FIG. 1. In some embodiments, vehicle 200 may comprise any one of several vehicles, such as, for example, but not limited to, an automobile (e.g., car, truck, bus, etc.), a maritime vehicle (e.g., boat, ship, etc.), airplanes (e.g., passenger jets, military jets, small craft planes, etc.), etc. Antenna 201 may be used to communicate while vehicle 200 is either on-the-pause or moving. Antenna 201 may be used to communicate to fixed locations as well, e.g., remote industrial sites (mining, oil, and gas) and/or remote renewable energy sites (solar farms, windfarms, etc.).

In some embodiments, antenna 201 is able to communicate with one or more communication infrastructures (e.g., satellite, cellular, networks (e.g., the Internet), etc.). For example, in some embodiments, antenna 201 is able to communication with satellites 220 (e.g., a GEO satellite) and 221 (e.g., a LEO satellite), cellular network 230 (e.g., an LTE, etc.), as well as network infrastructures (e.g., edge routers, Internet, etc.). For example, in some embodiments, antenna 201 comprises one or more satellite modems (e.g., a GEO modem, a LEO modem, etc.) to enable communication with various satellites such as satellite 220 (e.g., a GEO satellite) and satellite 221 (e.g., a LEO satellite) and one or more cellular modems to communicate with cellular network 230. For another example of an antenna communicating with one or more communication infrastructures, see U.S. Pat. No. 11,818,606, entitled "Multiple Aspects of Communication in a Diverse Communication Network", and issued Nov. 14, 2023.

In some embodiments, to facilitate communication with various satellites, antenna 201 performs dynamic beam steering. In such a case, antenna 201 is able to dynamically change the direction of a beam that it generates to facilitate communication with different satellites. In some embodiments, antenna 201 includes multi-beam beam steering that allows antenna 201 to generate two or more beams at the same time, thereby enabling antenna 201 to communication with more than one satellite at the same time. Such functionality is often used when switching between satellites (e.g., performing a handover). For example, in some embodiments, antenna 201 generates and uses a first beam for communicating with satellite 220 and generates a second beam simultaneously to establish communication with satellite 221. After establishing communication with satellite 221, antenna 201 stops generating the first beam to end communication with satellite 220 while switching over to communicate with satellite 221 using the second beam. For more information on multi-beam communication, see U.S. Pat. No. 11,063,661, entitled "Beam Splitting Hand Off Systems Architecture", issued Jul. 13, 2021.

In some embodiments, antenna 201 uses path diversity to enable a communication session that is occurring with one communication path (e.g., satellite, cellular, etc.) to continue during and after a handover with another communication path (e.g., a different satellite, a different cellular system, etc.). For example, if antenna 201 is in communication with satellite 220 and switches to satellite 221 by dynamically changing its beam direction, its session with satellite 220 is combined with the session occurring with satellite 221.

Thus, the antennas described herein may be part of a satellite terminal that enables ubiquitous communications and multiple different communication connections. In some embodiments, antenna 201 comprises a metasurface RF antenna having multiple RF radiating antenna elements that are tuned to desired frequencies using RF antenna element drive circuitry. The drive circuitry can include a drive transistor (e.g., a thin film transistor (TFT) (e.g., CMOS, NMOS, etc.), low or high temperature polysilicon transistor, memristor, etc.), a Microelectromechanical systems (MEMS) circuit, or other circuit for driving a voltage to an RF radiating antenna element. In some embodiments, the drive circuitry comprises an active-matrix drive. In some embodiments, the frequency of each antenna element is controlled by an applied voltage. In some embodiments, this applied voltage is also stored in each antenna element (pixel circuit) until the next voltage writing cycle.

Active Metasurface Architectures

Embodiments of this disclosure can include configurations for an active metasurface, in which amplifiers are incorporated into a metasurface to amplify a receiving and/or transmitting signal. Architectures for active holographic beamforming metasurface antennas are also disclosed herein designed to couple a received signal to a waveguide after amplification and phase adjustment.

Figure 3:
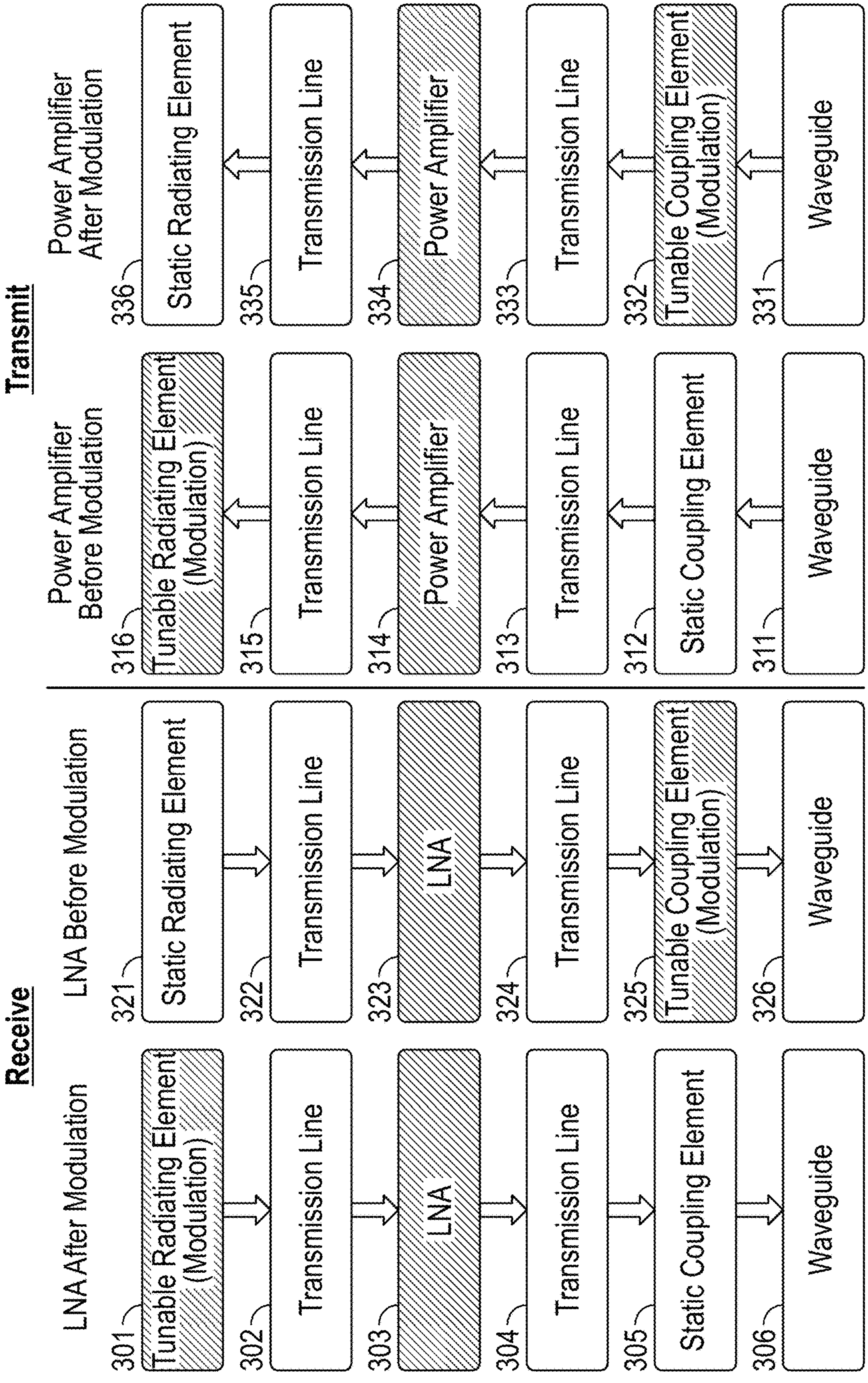
FIG. 3 illustrates signal flowcharts for two different architectures, applied for the receive and transmit paths, respectively, according to some embodiments.

FIG. 3 illustrates some embodiments of two antenna architectures that integrate amplifiers into the metasurface. For the first architecture, on the receive path, the LNA is placed after the hologram modulation is created and the required phase and amplitude adjustments are applied for the purpose of the beam forming, and on the transmit path, the signal is amplified before it arrives at the modulated hologram layer that creates the hologram modulation.

Referring to FIG. 3, the receive path for the first architecture includes a tunable radiating element 301 that, in operation, receives wirelessly transmitted signals and performs modulation (e.g., hologram modulation) and phase and amplitude adjustments on the received signals. A transmission line 302 passes the received signals from the tunable radiating element 301 to LNA 303, which amplifies the received signals. Transmission line 304 passes the amplified received signals to a static (non-tunable) coupling element 305, which transfers the amplified received signals to a waveguide 306.

On the transmit path for the first architecture according to some embodiments, when in operation, a waveguide 311 carries transmit signals to a static (non-tunable) coupling element 312 that couples the transmit signals to a transmission line 313. Transmission line 313 passes the signals to PA 314, which amplifies the transmit signals. Transmission line 315 passes the amplified transmits signals from PA 314 to tunable radiating element 316, which performs modulation (e.g., hologram modulation) and the phase and amplitude adjustments on the transmit signals for beamforming and radiates them.

For the second architecture, on the receive path, according to some embodiments, in operation, the hologram modulation is created after a receive signal is received and amplified. This architecture has as one of its advantages a lower or reduced signal loss before the signal is amplified. As a result, the expected G/T is higher than on the first architecture. For the second architecture, on the transmit path, the signal is amplified after it passes through the modulated hologram layer where modulation is applied.

The receive path for the second architecture includes a static (non-tunable) radiating element 321 that receives wirelessly transmitted signals. A transmission line 322 transfers the received signals from the radiating element 321 to LNA 323, which amplifies the received signals. Transmission line 324 transfers the amplified received signals to a tunable coupling element 325, which performs modulation (e.g., hologram modulation) and the phase and amplitude adjustments on the amplified received signals for beamforming and transfers the modulated, amplified received signals to a waveguide 326.

On the transmit path for the second architecture, a waveguide 331 carries transmit signals to a non-tunable coupling element 332 that performs modulation (e.g., hologram modulation) and the phase and amplitude adjustments on the transmit signals and then couples the transmit signals to a transmission line 333. Transmission line 333 passes the signals to PA 334, which amplifies the transmit signals. Transmission line 335 passes the amplified transmit signals from PA 334 to tunable radiating element 336, which radiates them.

Figure 4A:
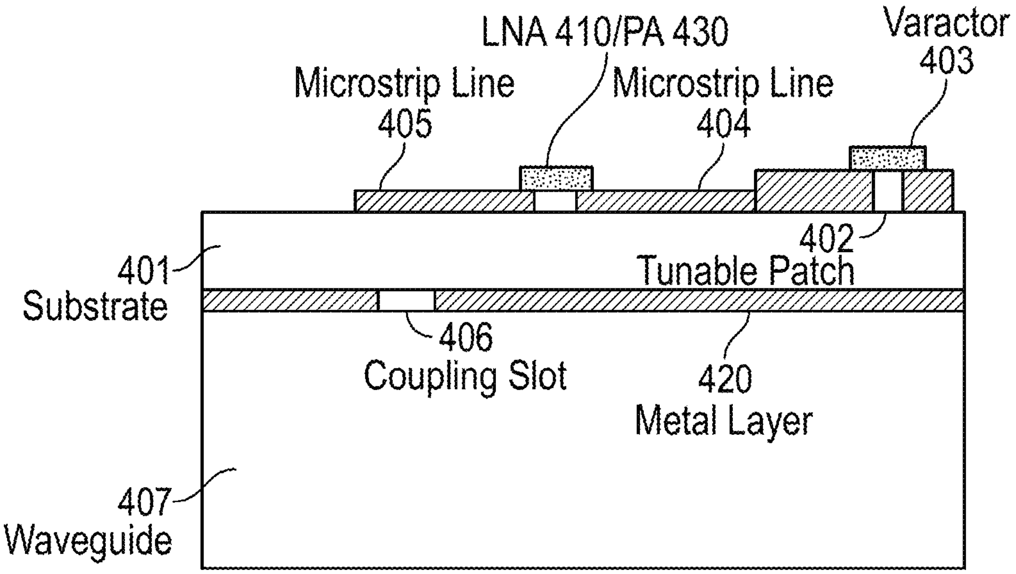
FIGS. 4A and 4B illustrate example architectures using microstrip lines and an example architecture using coplanar waveguide transmission lines, respectively.
Figure 4B:
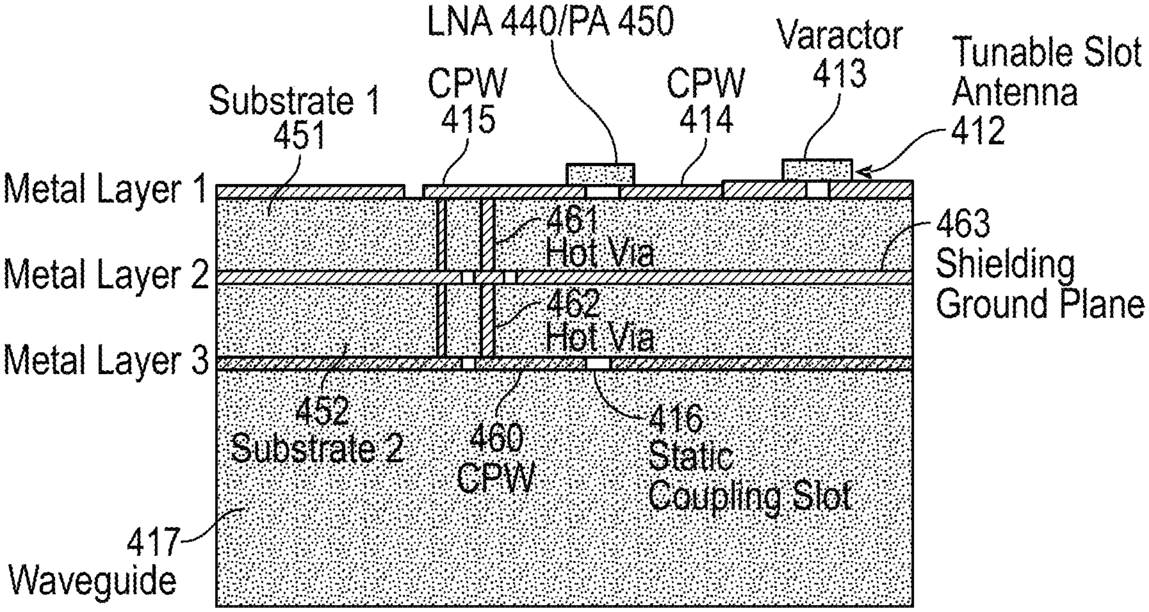

FIGS. 4A and 4B illustrate two examples of the first architecture of FIG. 3, in which a received signal passes through the modulated hologram before it is amplified. Referring to FIG. 4A, the metasurface includes a single substrate 401 (e.g., printed circuit board (PCB), etc.) that has a double-sided metallization and patterning. On the top layer, a tunable radiating element such as, for example, a microstrip patch antenna 402 is loaded with a varactor diode 403 that changes the resonance frequency of the patch. This resonance frequency change allows the phase and amplitude of the incoming signal to be adjusted at every radiating antenna element/unit cell individually. In some embodiments, patch antenna 402 can be replaced with a dipole, slot or other type of radiating element, and varactor diode 403 can be replaced with other types of tunable elements (e.g., liquid crystal, other type of diode, etc.). After the signal is received by patch antenna 402, the received signal couples to a microstrip line 404 (or some alternative transmission line (e.g., coplanar waveguide transmission line (CPW), etc.)), which passes the received signal to an LNA 410, which amplifies the received signal. After the signal amplification, another microstrip line 405 guides the amplified received signal to a coupling slot 406 that is in a metal layer 420 attached to signal substrate 401. Metal layer 420 acts as a ground plane for the circuits on the top layer, but it also has the coupling slot in it, while creating a ceiling of the waveguide underneath. Coupling slot 406 couples the received signal to a waveguide 407 adjacent, proximate, contiguous, or in some cases underneath the metasurface. In this arrangement, coupling slot 406 does not provide further phase and amplitude adjustments on the received signal for beamforming.

For transmit, in some embodiments, the architecture operates in a reverse fashion with a transmit signal coupling from waveguide 407 to microstrip line 405 via coupling slot 406, and then microstrip line 405 passes the transmit signal to PA 430, which amplifies the transmit signal. Note that while shown together in FIG. 4A for convenience, LNA 410 and PA 430 are separate electronic components. Microstrip line 404 passes the amplified transmit signal to patch 402 for modulation/phase amplitude adjustments for beamforming and radiation of the transmit signals.

Referring to FIG. 4B, according to some embodiments, a similar concept is implemented using a different transmission line than a microstrip line. Here, the metasurface includes two substrates 451 and 452 that have double-sided metallization and patterning including metal layers 1-3. On the top layer of substrate 451 referred to as metal layer 1, a tunable radiating element such as, for example, a tunable radiating slot antenna 412. Tunable slot antenna 412 is enforcing the hologram at this unit cell and is loaded with a varactor diode 413 that changes the resonance frequency of the radiating element. This resonance frequency change allows the phase and amplitude of the incoming signal to be adjusted for beamforming at every radiating antenna element/unit cell individually. In some other embodiments, tunable radiating slot 412 is replaced with a dipole, patch or other type of radiating element, and varactor diode 413 is replaced with other type of tunable element (e.g., liquid crystal, other types of diodes, etc.). After the signal is received by tunable slot antenna 412 and any modulation and the phase and amplitude adjustments for beamforming are performed, the received signal passes to an LNA 440 using a coplanar waveguide transmission line (CPW) 414 (or some alternative transmission line), where LNA 440 amplifies the received signal. After the signal amplification, another CPW 415 passes the amplified received signal to a static coupling slot 416 using a via structure. Static (non-tunable) coupling slot 416 is in a CPW 460 attached to substrate 452 using hot via (thru via carrying signal) 461 between electrically coupling metal layer 1 and metal layer 2 on both sides of substrate 451 and hot via 462 between electrically coupling metal layers 2 and 3 on both sides of substrate 452. The metallization at metal layer 2 operates as a shielding ground plane to decouple the top and bottom substrates 451 and 452 from each other and ensures that the input and output of LNA 440 are not coupling to each other. Coupling slot 416 couples the received signal to a waveguide 417 adjacent, proximate, contiguous, or in some cases underneath the metasurface. In this arrangement, coupling slot 416 does not provide further phase and amplitude adjustments on the received signal.

For transmit, the architecture operates in a reverse fashion with a transmit signal coupling from waveguide 417 to CPW 415 via coupling slot 416 and hot vias 462 and 461. The transmit signal transfers from CPW 415 to PA 450, which amplifies the transmit signal. Note that while shown together in FIG. 4B for convenience, LNA 440 and PA 450 are separate electronic components. CPW 414 passes the amplified transmit signal to tunable slot antenna 412 for modulation/phase amplitude adjustments for beamforming and then radiation of the transmit signals.

Figure 5A:
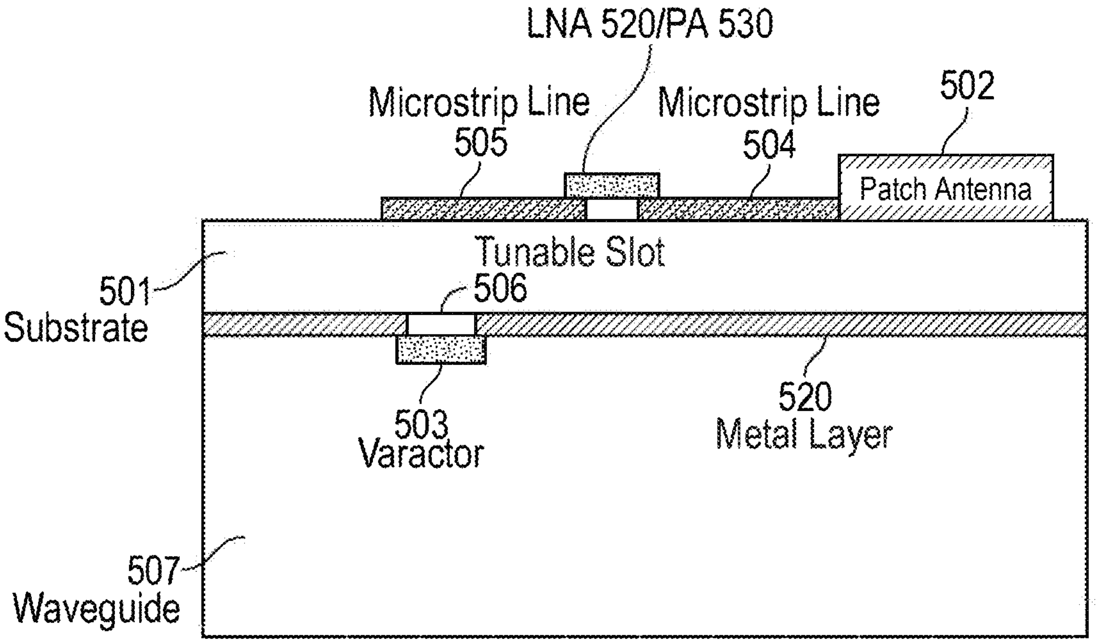
FIGS. 5A and 5B illustrate an additional architecture example having microstrip lines with a varactor and an LNA being placed at the two opposite sides of a substrate and an architecture using microstrip lines but with the LNA and the varactor on the same side of a substrate.
Figure 5B:
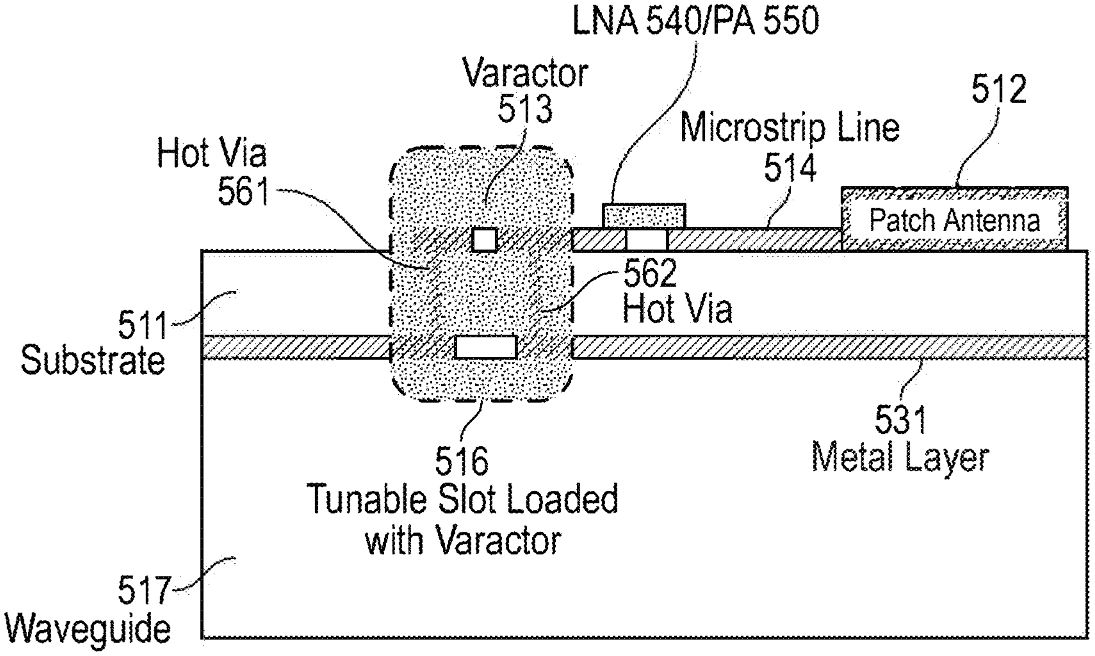

FIGS. 5A and 5B show two integration examples for the second architecture shown in FIG. 3. Referring to FIG. 5A, an incoming signal is received by a static patch antenna 502 that is attached to substrate 501. At this point, there is no modulation (e.g., amplitude and/or phase shifting for beamforming) applied to the received signal. In some other embodiments, other types of antenna elements can be used. The received signal is then carried via microstrip line 504 (or some other transmission line (e.g., CPW, etc.)) attached to substrate 501 to LNA 520, where the received signal is amplified. A microstrip line 505 (or other transmission line) attached to substrate 501 carries the amplified signal from LNA 520 and then its energy couples via tunable (coupling) element/slot 506 in metal layer 520 to waveguide 507. At this stage, while the amplified received signal is being coupled to waveguide 507, modulation (e.g., hologram modulation) is applied and its phase and/or amplitude are adjusted for beamforming through the use of a tuning element coupled across, and loading, tunable slot 506. In some embodiments, the tuning element is a varactor 503, and this architecture assumes that the varactor in every unit cell can be controlled individually. Thus, varactor 503 is able to tune the impedance to cause a phase shift to the signal to implement modulation. In contrast to the examples in architecture 1 of FIG. 3, the hologram is created at the coupling layer and not the radiating element.

During transmit, a wave propagates through waveguide 507 to tunable slot 506, where it's phase-shifted as its being coupled to microstrip 505 via tunable slot 506. Varactor 503 is tuned to apply modulation to the transmit signal (e.g., creating a hologram at the coupling layer and not the radiating element). The modulated signal is coupled to microstrip 505 and proceeds through PA 530 where the transmit signal is amplified and then passed to patch antenna 502, via microstrip line 504, where patch antenna 502 radiates the transmit signal. Note that while shown together in FIG. 5A for convenience, LNA 520 and PA 530 are separate electronic components.

FIG. 5B shows a derivative architecture of the concept in FIG. 5A according to some embodiments. Referring to FIG. 5B, a difference in this architecture is that the varactor is moved adjacent, contiguous, proximate, and/or above the top or microstrip layer, while it is still loading and tuning the coupling slot on the bottom of the substrate. This architecture has the advantage that all discrete components (e.g., the varactor, LNA, PA, etc.) are placed on the same side of the substrate, simplifying the manufacturing process of this architecture. Furthermore, the required drive circuitries for tuning the varactor and for driving the LNAs are on the same side as the discrete components. This arrangement further reduces the complexity in manufacturing. As shown in FIG. 5B, thru vias could be used to couple or connect the varactor to load the tunable slot on the bottom side of the substrate with the varactor.

Referring to FIG. 5B, according to some embodiments, in operation, a static patch antenna 512 that is attached to substrate 511 receives an incoming signal. At this point, there is no modulation (e.g., amplitude and/or phase shifting for beamforming) applied to the received signal. In some other embodiments, other types of antenna elements can be used. The received signal is then carried via microstrip line 514 (or some other transmission line e.g., CPW, etc.)) attached to substrate 511 to LNA 540, where the received signal is amplified. A microstrip line 514 (or other transmission line) attached to substrate 511 carries the amplified signal from LNA 540 and then its energy couples via tunable coupling element/slot 516 in metal layer 531 to waveguide 517. At this stage, while the amplified received signal is being coupled to waveguide 517 from microstrip line 514 via tunable slot 516, modulation is applied and its phase and/or amplitude are adjusted for beamforming through the use of a tuning element, coupled across microstrip lines on top of substrate 511, that loads tunable slot 516. In some embodiments, the tuning element is a varactor 513, and this architecture assumes that the varactor in every unit cell can be controlled individually. Thus, varactor 513 is able to tune the impedance to cause a phase shift to the signal to implement modulation. In contrary to the examples in architecture 1 of FIG. 3, the hologram is created at the coupling layer and not the radiating element.

During transmit, a wave propagates through waveguide 517 to tunable slot 516, where it is phase shifted as it is being coupled to microstrip 514 via tunable slot 516. Varactor 513 is tuned to apply modulation to the transmit signal (e.g., creating a hologram at the coupling layer and not the radiating element). The modulated signal is coupled to microstrip 514 and proceeds through PA 550 where the transmit signal is amplified and then passed to patch antenna 512, via microstrip line 514, where patch antenna 512 radiates the transmit signal. Note that while shown together in FIG. 5B for convenience, LNA 540 and PA 550 are separate electronic components.

Figure 6A:
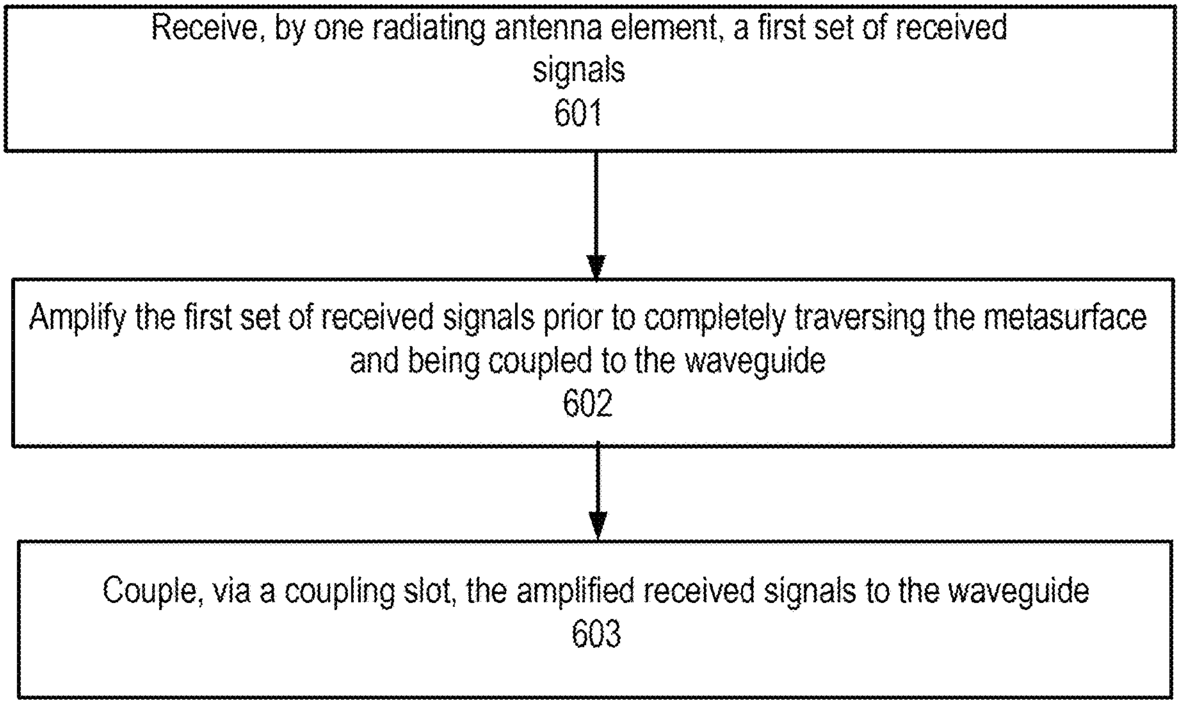
FIG. 6A is a flow diagram of a process, according to some embodiments, for receiving signals with an antenna.

FIG. 6A is a flow diagram of a process, according to some embodiments, for receiving signals with an antenna having a waveguide and a metasurface coupled to the waveguide and having integrated amplifiers to amplify signals being received by radiating antenna elements.

Referring to FIG. 6A, the process begins by receiving, by one radiating antenna element, a first set of received signals (601). In some embodiments, the one radiating antenna element is part of the metasurface. The process continues by amplifying the first set of received signals prior to completely traversing the metasurface and being coupled to the waveguide (602). In some embodiments, the first set of signals are amplified using a receive path having a low noise amplifier (LNA). Next, the process couples, via a coupling slot, the amplified received signals to the waveguide (603).

In some embodiments, amplifying the first set of received signals includes amplifying the first set of received signals with the LNA after modulation and the transmit path is configured to amplify the second set of signals with the PA before modulation. In some embodiments, amplifying the first set of received signals comprises amplifying the first set of received signals with the LNA before modulation and the transmit path is configured to amplify the second set of received signals with the PA after modulation.

Figure 6B:
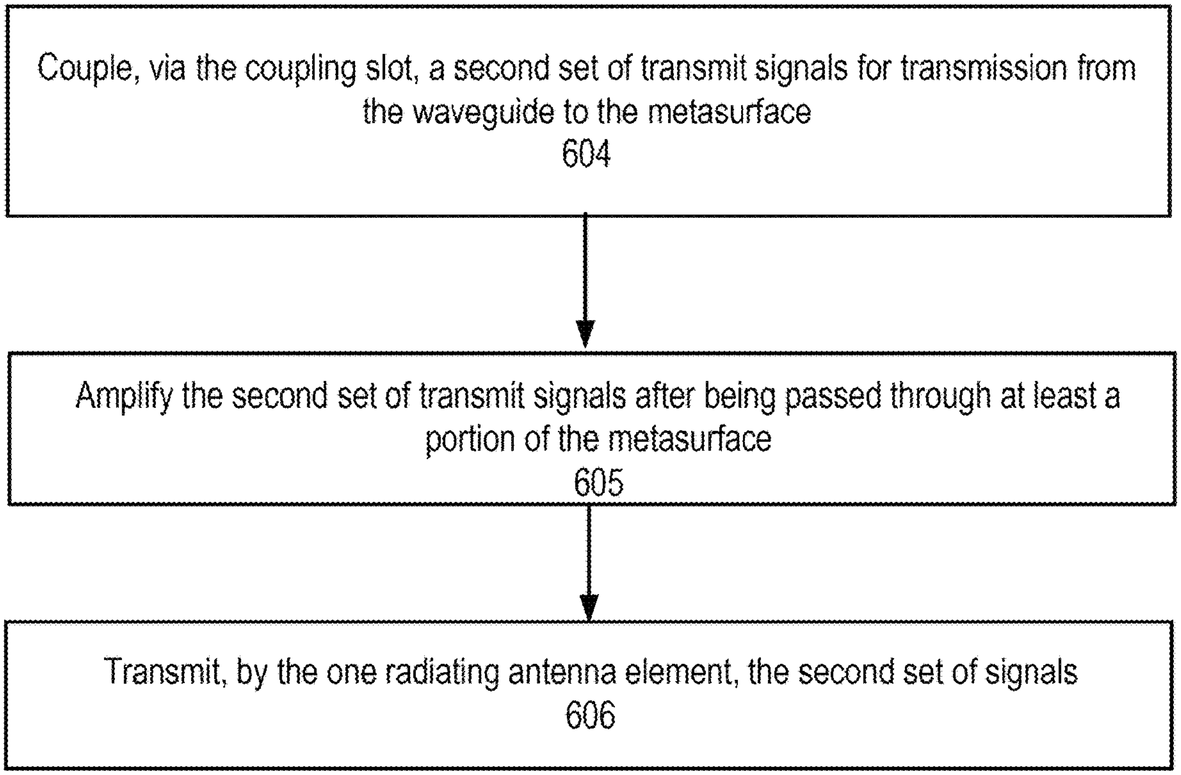
FIG. 6B is a flow diagram of a process, according to some embodiments, for transmitting signals with an antenna.

FIG. 6B is a flow diagram of a process, according to some embodiments, for transmitting signals with an antenna having a waveguide and a metasurface coupled to the waveguide and having integrated amplifiers to amplify signals to be transmitted by radiating antenna elements.

Referring to FIG. 6B, the process begins by coupling, via the coupling slot, a second set of transmit signals for transmission from the waveguide to the metasurface (604) and amplifying the second set of transmit signals after being passed through at least a portion of the metasurface (605). In some embodiments, the second set of signals are amplified using a transmit path having a power amplifier (PA). After amplifying the second set of signals, the process includes the one radiating antenna element transmitting the second set of signals (606).

In some embodiments, amplifying the first set of received signals includes amplifying the first set of received signals with the LNA before hologram modulation and application of phase and amplitude adjustments for beamforming and amplifying the second set of transmit signals includes amplifying the second set of signals with the PA after hologram modulation and application of phase and amplitude adjustments for beamforming.

In some embodiments, amplifying the first set of received signals includes amplifying the first set of received signals with the LNA after modulation and the transmit path is configured to amplify the second set of signals with the PA before modulation. In some embodiments, amplifying the first set of received signals includes amplifying the first set of received signals with the LNA after hologram modulation and application of phase and amplitude adjustments for beamforming and amplifying the second set of transmit signals includes amplifying the second set of transmit signals with the PA before hologram modulation and application of phase and amplitude adjustments for beamforming.

In some embodiments, amplifying the first set of received signals includes amplifying the first set of received signals with the LNA before hologram modulation and application of phase and amplitude adjustments for beamforming and amplifying the second set of transmit signals includes amplifying the second set of signals with the PA after hologram modulation and application of phase and amplitude adjustments for beamforming.

Embodiments disclosed herein include one or more improvements. For example, on the receive side, in a passive metasurface antenna, low noise amplification is provided down-stream of the antenna element, feed, and diplexer losses, which is not ideal. A better place for low-noise amplification is as close to the receiving antenna element as possible. In the active metasurface concept disclosed herein, placing the low noise amplifier at the antenna element can improve G/T by greater than 1 dB. As for improvement on the transmit side, in a passive metasurface antenna, larger/more expensive amplifiers are required on the back of the antenna (in comparison to when amplifiers are integrated onto the metasurface as described herein) to provide the required effective isotropic radiated power (EIRP) while overcoming the feed losses and other radiation losses in the antenna. In the active metasurface antenna disclosed herein, a much smaller/cheaper amplifier can be used on the back of the antenna than is used when amplifiers are not integrated onto the metasurface as described herein. The amplifiers in the metasurface amplify the signal from the input amplifier and provide the output power to achieve the required EIRP. Furthermore, improved power added efficiency (PAE) can be obtained by putting the amplification stage into the metasurface. Additionally, by incorporating amplification into the metasurface with the LNAs and PAs, the active metasurface antennas incorporate gain into the Rx and Tx antenna elements.

Embodiments disclosed herein include one or more of the following advantages: improved receive antenna Gain-to-Noise temperature ratio, lower BOM cost, lower power consumption, reduced manufacturing complexity of active metasurfaces, and a more highly integrated terminal design, with smaller height profile.

There is a number of example embodiments described herein.

Example 1 is an antenna including a metasurface having radiating antenna elements and amplifiers configured to amplify signals for the radiating antenna elements, wherein, for each of the radiating antenna elements, the metasurface includes one or both of: a receive path having a low noise amplifier (LNA) configured to amplify a first set of received signals, at least one radiating antenna element configured to receive the first set of received signals, and a transmit path having a power amplifier (PA) configured to amplify a second set of transmit signals, the second set of transmit signals to be transmitted from the one radiating antenna element.

Example 2 is the antenna of example 1 that may optionally include that the receive path is configured to amplify the first set of received signals with the LNA after the metasurface is modulated to form a beam and the transmit path is configured to amplify the second set of signals with the PA before modulation.

Example 3 is the antenna of example 2 that may optionally include that at least one of the radiating antenna elements comprises: a substrate having a top and a bottom; a frequency tunable radiating element coupled to the substrate to receive and to transmit signals; a first transmission line attached to the top of the substrate and electrically coupled to the tunable radiating element to transfer the signals to and from the tunable radiating element; an LNA coupled to the first transmission line to amplify received signals received by the tunable radiating element; a second transmission line coupled to the top of the substrate to receive the amplified received signals from the LNA; and a coupling slot in a ground plane coupled to the bottom of the substrate to couple the amplified received signals from the second transmission line.

Example 4 is the antenna of example 3 that may optionally include a PA coupled to the first and second transmission lines to amplify transmit signals to be transmitted by the tunable radiating element, and wherein the tunable radiating element is loaded with a tunable element to tune the radiating element.

Example 5 is the antenna of example 4 that may optionally include that the tunable element comprises a varactor or a tunable capacitor.

Example 6 is the antenna of example 3 that may optionally include that at least one of the first and second transmission lines is a microstrip line.

Example 7 is the antenna of example 2 that may optionally include that at least one of the radiating antenna elements includes: a multi-layer printed circuit board (PCB) in which the circuit layers are electrically coupled to transfer signals using one or more hot vias; a tunable slot antenna coupled to a top of a top layer of the PCB to receive and to transmit signals; a first transmission line attached to the top of the top layer of the PCB and electrically coupled to the tunable slot antenna to transfer the signals to and from the tunable radiating element; an LNA coupled to the first transmission line to amplify received signals received by the tunable slot antenna; a second transmission line attached to the top of the top layer of the PCB to receive the amplified received signals from the LNA; and a coupling slot in coplanar waveguide transmission line coupled to a bottom layer of the PCB to couple the amplified received signals from the second transmission line.

Example 8 is the antenna of example 7 that may optionally include a PA coupled to the first and second transmission lines to amplify transmit signals to be transmitted by the tunable slot antenna, and wherein the tunable slot antenna is loaded with a tunable element to tune the tunable slot antenna.

Example 9 is the antenna of example 8 that may optionally include that the tunable element comprises a varactor.

Example 10 is the antenna of example 7 that may optionally include that at least one of the first and second transmission lines is a coplanar waveguide transmission line.

Example 11 is the antenna of example 1 that may optionally include that the receive path is configured to amplify the first set of received signals with the LNA after hologram modulation and application of phase and amplitude adjustments for beamforming.

Example 12 is the antenna of example 1 that may optionally include that the transmit path is configured to amplify the second set of signals with the PA before hologram modulation and application of phase and amplitude adjustments for beamforming.

Example 13 is the antenna of example 1 that may optionally include that the receive path is configured to amplify the first set of received signals with the LNA before modulation and the transmit path is configured to amplify the second set of received signals with the PA after modulation.

Example 14 is the antenna of example 13 that may optionally include that at least one of the radiating antenna elements includes: a substrate having a top and a bottom; a frequency tunable radiating element coupled to the substrate to receive or to transmit signals; a first transmission line attached to the top of the substrate and electrically coupled to the tunable radiating element to transfer the signals to and from the tunable radiating element; an LNA coupled to the first transmission line to amplify received signals received by the tunable radiating element; a second transmission line coupled to the top of the substrate to receive the amplified received signals from the LNA; and a tunable slot in a ground plane coupled to the bottom of the substrate for coupling the amplified received signals from the second transmission line.

Example 15 is the antenna of example 14 that may optionally include a PA coupled to the first and second transmission lines to amplify transmit signals to be transmitted by the tunable radiating element, and wherein the tunable slot is loaded with a tunable element to tune the resonance frequency of the slot.

Example 16 is the antenna of example 15 that may optionally include that the tunable element comprises a varactor or a tunable capacitor.

Example 17 is the antenna of example 14 that may optionally include that at least one of the first and second transmission lines is a microstrip line.

Example 18 is the antenna of example 13 that may optionally include that at least one of the radiating antenna elements includes: a substrate having a top and a bottom; a first radiating element coupled to the substrate to receive and to transmit signals; a first transmission line attached to the top of the substrate and electrically coupled to the first radiating element to transfer the signals to and from the patch antenna; an LNA coupled to the first transmission line to amplify received signals received by the first radiating element; a second transmission line attached to the top of the substrate to receive the amplified received signals from the LNA; and a tunable slot in a ground plane attached to the bottom of the substrate to couple the amplified received signals from the second transmission line to the waveguide, wherein the tunable slot is loaded with a tunable element coupled to the second transmission line to tune the tunable slot.

Example 19 is the antenna of example 18 that may optionally include a PA coupled to the first and second transmission lines to amplify transmit signals to be transmitted by the radiating element.

Example 20 is the antenna of example 18 that may optionally include that the tunable element comprises a varactor.

Example 21 is the antenna of example 18 that may optionally include that at least one of the first and second transmission lines is a microstrip line.

Example 22 is the antenna of example 1 that may optionally include that the receive path is configured to amplify the first set of received signals with the LNA before hologram modulation and application of phase and amplitude adjustments for beamforming and the transmit path is configured to amplify the second set of signals with the PA after hologram modulation and application of phase and amplitude adjustments for beamforming.

Example 23 is a method for transmitting and receiving signals with an antenna having a waveguide and a metasurface coupled to the waveguide and having amplifiers to amplify signals being received by radiating antenna elements and signals to be transmitted by radiating antenna elements, where the method includes: receiving, by one radiating antenna element, a first set of received signals; amplifying, using a receive path having a low noise amplifier (LNA), the first set of received signals prior to being coupled to the waveguide; and coupling, via a coupling slot, the amplified received signals to the waveguide.

Example 24 is the method of example 23 that may optionally include coupling, via the coupling slot, a second set of transmit signals for transmission from the waveguide to the metasurface; amplifying, using a transmit path having a power amplifier (PA), the second set of transmit signals after being passed through at least a portion of the metasurface; and transmitting, by the one radiating antenna element, the second set of signals.

Example 25 is the method of example 24 that may optionally include that amplifying the first set of received signals comprises amplifying the first set of received signals with the LNA after modulation and the transmit path is configured to amplify the second set of signals with the PA before modulation.

Example 26 is the method of example 24 that may optionally include that amplifying the first set of received signals comprises amplifying the first set of received signals with the LNA after hologram modulation and application of phase and amplitude adjustments for beamforming and wherein amplifying the second set of transmit signals comprises amplifying the second set of transmit signals with the PA before hologram modulation and application of phase and amplitude adjustments for beamforming.

Example 27 is the method of example 24 that may optionally include that amplifying the first set of received signals comprises amplifying the first set of received signals with the LNA before modulation and the transmit path is configured to amplify the second set of received signals with the PA after modulation.

Example 28 is the method of example 24 that may optionally include that amplifying the first set of received signals comprises amplifying the first set of received signals with the LNA before hologram modulation and application of phase and amplitude adjustments for beamforming and wherein amplifying the second set of transmit signals comprises amplifying the second set of signals with the PA after hologram modulation and application of phase and amplitude adjustments for beamforming.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

The invention claimed is:

1. An antenna comprising:

a metasurface having radiating antenna elements and amplifiers configured to amplify signals for the radiating antenna elements, wherein, for each of the radiating antenna elements, the metasurface includes one or both of:

a receive path having a low noise amplifier (LNA) between a first coupling element and said each radiating antenna element, the LNA configured to amplify a first set of received signals, said each radiating antenna element configured to receive the first set of received signals, and a transmit path having a power amplifier (PA) between a second coupling element and said each radiating antenna element, the PA configured to amplify a second set of transmit signals, the second set of transmit signals to be transmitted from said each radiating antenna element; and a waveguide coupled to the metasurface.

2. The antenna of claim 1 wherein the receive path is configured to amplify the first set of received signals with the LNA after the metasurface is modulated to form a beam and the transmit path is configured to amplify the second set of signals with the PA before modulation.

3. The antenna of claim 2 wherein at least one of the radiating antenna elements comprises:

a substrate having a top and a bottom;

a frequency tunable radiating element coupled to the substrate to receive and to transmit signals;

a first transmission line attached to the top of the substrate and electrically coupled to the tunable radiating element to transfer the signals to and from the tunable radiating element;

an LNA coupled to the first transmission line to amplify received signals received by the tunable radiating element;

a second transmission line coupled to the top of the substrate to receive the amplified received signals from the LNA; and a coupling slot in a ground plane coupled to the bottom of the substrate to couple the amplified received signals from the second transmission line.

4. The antenna of claim 3 further comprising:

a PA coupled to the first and second transmission lines to amplify transmit signals to be transmitted by the tunable radiating element, and wherein the tunable radiating element is loaded with a tunable element to tune the radiating element.

5. The antenna of claim 4 wherein the tunable element comprises a varactor or a tunable capacitor.

6. The antenna of claim 3 wherein at least one of the first and second transmission lines is a microstrip line.

7. The antenna of claim 2 wherein at least one of the radiating antenna elements comprises:

a multi-layer printed circuit board (PCB) in which the circuit layers are electrically coupled to transfer signals using one or more hot vias;

a tunable slot antenna coupled to a top of a top layer of the PCB to receive and to transmit signals;

a first transmission line attached to the top of the top layer of the PCB and electrically coupled to the tunable slot antenna to transfer the signals to and from the tunable radiating element;

an LNA coupled to the first transmission line to amplify received signals received by the tunable slot antenna;

a second transmission line attached to the top of the top layer of the PCB to receive the amplified received signals from the LNA; and a coupling slot in coplanar waveguide transmission line coupled to a bottom layer of the PCB to couple the amplified received signals from the second transmission line.

8. The antenna of claim 7 further comprising:

a PA coupled to the first and second transmission lines to amplify transmit signals to be transmitted by the tunable slot antenna, and wherein the tunable slot antenna is loaded with a tunable element to tune the tunable slot antenna.

9. The antenna of claim 8 wherein the tunable element comprises a varactor.

10. The antenna of claim 7 wherein at least one of the first and second transmission lines is a coplanar waveguide transmission line.

11. The antenna of claim 1 wherein the receive path is configured to amplify the first set of received signals with the LNA after hologram modulation and application of phase and amplitude adjustments for beamforming.

12. The antenna of claim 1 wherein the transmit path is configured to amplify the second set of signals with the PA before hologram modulation and application of phase and amplitude adjustments for beamforming.

13. The antenna of claim 1 wherein the receive path is configured to amplify the first set of received signals with the LNA before modulation and the transmit path is configured to amplify the second set of received signals with the PA after modulation.

14. The antenna of claim 13 wherein at least one of the radiating antenna elements comprises:

a substrate having a top and a bottom;

a frequency tunable radiating element coupled to the substrate to receive or to transmit signals;

a first transmission line attached to the top of the substrate and electrically coupled to the tunable radiating element to transfer the signals to and from the tunable radiating element;

an LNA coupled to the first transmission line to amplify received signals received by the tunable radiating element;

a second transmission line coupled to the top of the substrate to receive the amplified received signals from the LNA; and a tunable slot in a ground plane coupled to the bottom of the substrate for coupling the amplified received signals from the second transmission line.

15. The antenna of claim 14 further comprising:

a PA coupled to the first and second transmission lines to amplify transmit signals to be transmitted by the tunable radiating element, and wherein the tunable slot is loaded with a tunable element to tune the resonance frequency of the slot.

16. The antenna of claim 15 wherein the tunable element comprises a varactor or a tunable capacitor.

17. The antenna of claim 14 wherein at least one of the first and second transmission lines is a microstrip line.

18. The antenna of claim 13 wherein at least one of the radiating antenna elements comprises:

a substrate having a top and a bottom;

a first radiating element coupled to the substrate to receive and to transmit signals;

a first transmission line attached to the top of the substrate and electrically coupled to the first radiating element to transfer the signals to and from the patch antenna;

an LNA coupled to the first transmission line to amplify received signals received by the first radiating element;

a second transmission line attached to the top of the substrate to receive the amplified received signals from the LNA; and a tunable slot in a ground plane attached to the bottom of the substrate to couple the amplified received signals from the second transmission line to the waveguide, wherein the tunable slot is loaded with a tunable element coupled to the second transmission line to tune the tunable slot.

19. The antenna of claim 18 further comprising:

a PA coupled to the first and second transmission lines to amplify transmit signals to be transmitted by the radiating element.

20. The antenna of claim 18 wherein the tunable element comprises a varactor.

21. The antenna of claim 18 wherein at least one of the first and second transmission lines is a microstrip line.

22. The antenna of claim 1 wherein the receive path is configured to amplify the first set of received signals with the LNA before hologram modulation and application of phase and amplitude adjustments for beamforming and the transmit path is configured to amplify the second set of signals with the PA after hologram modulation and application of phase and amplitude adjustments for beamforming.

* * * * *